Patented June 24, 1947

2,422,743

UNITED STATES PATENT OFFICE 2,422,743

PROCESS FOR PREPARATION OF AMINES

Walter K. O'Loughlin, Terre Haute, Ind., assignor to Commercial Solvents Corporation, Terre Haute, Ind., a corporation of Maryland No Drawing. Application May 13, 1944,
Serial No. 535,545

3 Claims. (Cl. 260—583)

This invention relates to a process for the preparation of amines in the liquid phase from ketones and ammonia, and more particularly it relates to the synthesis of isopropylamine and 1-methylpropylamine from acetone and methyl ethyl ketone, and ammonia respectively.

It is known that primary amines may be prepared by hydrogenating the reaction product of a ketone and ammonia under pressure in the liquid phase and in the presence of a suitable catalyst, such as for example, a catalyst derived from nickel or various compounds thereof. By such procedure, primary alkylamines are obtained in relatively good yields and quality.

I have now discovered that the yield of primary alkylamines obtained in accordance with the procedure generally referred to above can be materially improved by adding to the mixture of ammonia and acetone or methyl ethyl ketone, prior to hydrogenation, from about 2.5 to 45.0 per cent of water based on the weight of the ketone and ammonia present.

In carrying out the process of my invention, the reaction may be effected in a hydrogenation apparatus of conventional design. I have found it preferable, however, to employ a hydrogenation apparatus having a removable hydrogenation chamber which may be conveniently cooled to the approximate temperature of Dry Ice. In practicing my invention, a mixture consisting of ketone, ammonia, catalyst (preferably Raney nickel), and water is introduced into a hydrogenation chamber cooled with Dry Ice. After this mixture has been added, the chamber or bomb is sealed and transferred to the hydrogenation apparatus proper. Hydrogen is then introduced up to about 500 lbs. per sq. in. pressure. Thereafter, the bomb is heated to temperatures ranging between 75 and 150° C., depending upon the particular ketone employed. During the hydrogenation period, the bomb is preferably agitated. After hydrogen absorption appears to be complete, the bomb is withdrawn from the hydrogenation apparatus proper, cooled first in water and then in Dry Ice. The reduction mixture is then removed from the bomb, weighed, and in the event that a volatile amine has been employed, it is preferable to quickly measure the amount of amine present by titration with standard acid, and then quickly charge into a suitable distillation unit. This mixture contained in the still is then slowly heated to reflux temperature and allowed to reflux gently until all of the excess ammonia has been driven off. The residue, which consists principally of the primary alkylamine may then be obtained in substantially pure form by fractional distillation under reduced pressure. The quantity of primary alkylamine in the residue may be satisfactorily determined by titrating an aliquot sample thereof with standard acid.

In the table which follows, the beneficial effect of the addition of water to the reduction mixture is demonstrated by the data obtained in a series of runs in which acetone was employed as the ketone. The majority of such runs were effected at a temperature of approximately 110° C.

The reaction mixture hydrogenated had the following composition:

Acetone_____ 395 parts by weight
Ammonia_____ 130 parts by weight
Raney nickel_____ 10 parts by weight
Adjunct_____ As specified in table Table

| Adjunct | Concentration | Hydrogen absorbed | Time | Yield [1] |
|---|---|---|---|---|
| | Per cent | Lb./in. | Hr. | Per cent |
| None | | 2,850 | 2.4 | 78.4 |
| Water | 2.66 | 3,000 | 1.75 | 81.1 |
| Do | 5.3 | 2,825 | 2.0 | 85.0 |
| Do | 10.6 | 3,000 | 2.25 | 84.8 |
| Do | 21.2 | 3,175 | 1.4 | 85.6 |
| Do | 42.4 | 3,150 | 1.75 | 89.0 |

[1] Calculated on basis of acetone.

From the data appearing in the above table, the improved results obtainable by the use of varying percentages of water in the hydrogenation mixtures will be apparent. If the above results are plotted, it will be noted that the increase in yield produced by the addition of about 5 per cent of water at the start of the process is much more marked than that produced by the addition of 2.66 per cent of water. Different results will be, in general, obtained by varying the catalyst as well as the particular ketone employed. However, in general, a substantial improvement in yield will be observed when hydrogenating mixtures of ammonia and either of the aforesaid ketones in accordance with the process of my invention.

It will be obvious to those skilled in the art that numerous modifications exist in the procedure employed for carrying out my invention. Such modifications or any steps involving the addition of water to a mixture of ketone and ammonia wherein such mixture is subsequently hydrogenated in the liquid phase to produce the corresponding primary alkylamine is to be considered as lying within the scope of my invention.

My invention now having been described, what I claim is:

1. In a process for the preparation of primary alkylamines by the catalytic liquid phase hydrogenation at elevated temperatures between 75–150° C. and pressures up to about 500 lbs. per square inch of mixtures comprising ammonia and a ketone selected from the group consisting of acetone and methyl ethyl ketone, and a hydrogenation catalyst, the improvement which comprises introducing into said mixtures at the start of the process from about 2.5 to 45% of water based on the weight of ketone and ammonia present.

2. The process of claim 1 in which the ketone is acetone.

3. In the preparation of primary alkylamines by the catalytic liquid phase hydrogenation of mixtures comprising ammonia, a hydrogenation catalyst, and a ketone selected from a class consisting of acetone and methyl ethyl ketone, the process which comprises adding to such a mixture from about 5 to 45 per cent of water, based on the weight of the ketone and ammonia present, then heating the mixture to a temperature within the range of about 75 to 150° C. under a superatmospheric pressure of hydrogen, and recovering the primary alkylamine thereby formed.

WALTER K. O'LOUGHLIN.

REFERENCES CITED

The following references are of record in the file of this patent:

UNITED STATES PATENTS

| Number | Name | Date |
| --- | --- | --- |
| 2,317,757 | Graf | Apr. 27, 1943 |
| 2,278,372 | Olin | Mar. 31, 1942 |
| 2,045,574 | Adkins | June 30, 1936 |

FOREIGN PATENTS

| Number | Country | Date |
| --- | --- | --- |
| 365,214 | Great Britain | Jan. 21, 1932 |

OTHER REFERENCES

Mignonac "Comptes Renders," vol. 172, p. 223–226.